E. W. COMFORT.
THERMOSTATIC REGULATING DEVICE.
APPLICATION FILED AUG. 2, 1911.

1,032,189.

Patented July 9, 1912.

WITNESSES:
Lucius B. Weymouth
Thomas M. Blair

INVENTOR.
Edward W. Comfort
BY
Henry J. Miller
ATTORNEY.

UNITED STATES PATENT OFFICE.

EDWARD W. COMFORT, OF CHICAGO, ILLINOIS, ASSIGNOR TO AMERICAN MOISTENING COMPANY, OF BOSTON, MASSACHUSETTS, A CORPORATION OF MAINE.

THERMOSTATIC REGULATING DEVICE.

1,032,189.

Specification of Letters Patent.   Patented July 9, 1912.

Application filed August 2, 1911. Serial No. 641,898.

*To all whom it may concern:*

Be it known that I, EDWARD W. COMFORT, of Chicago, in the county of Cook and State of Illinois, have invented certain new and useful Improvements in Thermostatic Regulating Devices, of which the following is a specification, reference being had to the accompanying drawings, forming part thereof.

This invention relates to improvements in devices or instruments adapted to be influenced by the temperature and the humidity of the surrounding atmosphere to effect the control or regulation of mechanism by or through which directly or indirectly additional moisture may be supplied to said atmosphere.

One object of this invention is so to construct a thermostatic regulating device having independent expansible elements adapted to be influenced respectively by the temperature and humidity of the surrounding atmosphere that the expansion or contraction of either of said elements may effect the operation of closing or opening of a valve.

Another object of this invention is so to construct a thermostatic regulating device comprising expansible elements for the valve of a pressure system that said valve and the outlet controlled thereby may be adjusted in angular position with reference to said elements, whereby the degree of moisture relative to the saturation point may be controlled.

Another object of this invention is to provide an apparatus of the character described having adjustments so that the pre-determined relationship of the expansible elements to the regulating mechanism may be changed to meet varied requirements.

Other objects of the invention will appear from the following description.

The invention consists in the thermostatic regulating device hereinafter described and claimed.

Figure 1:
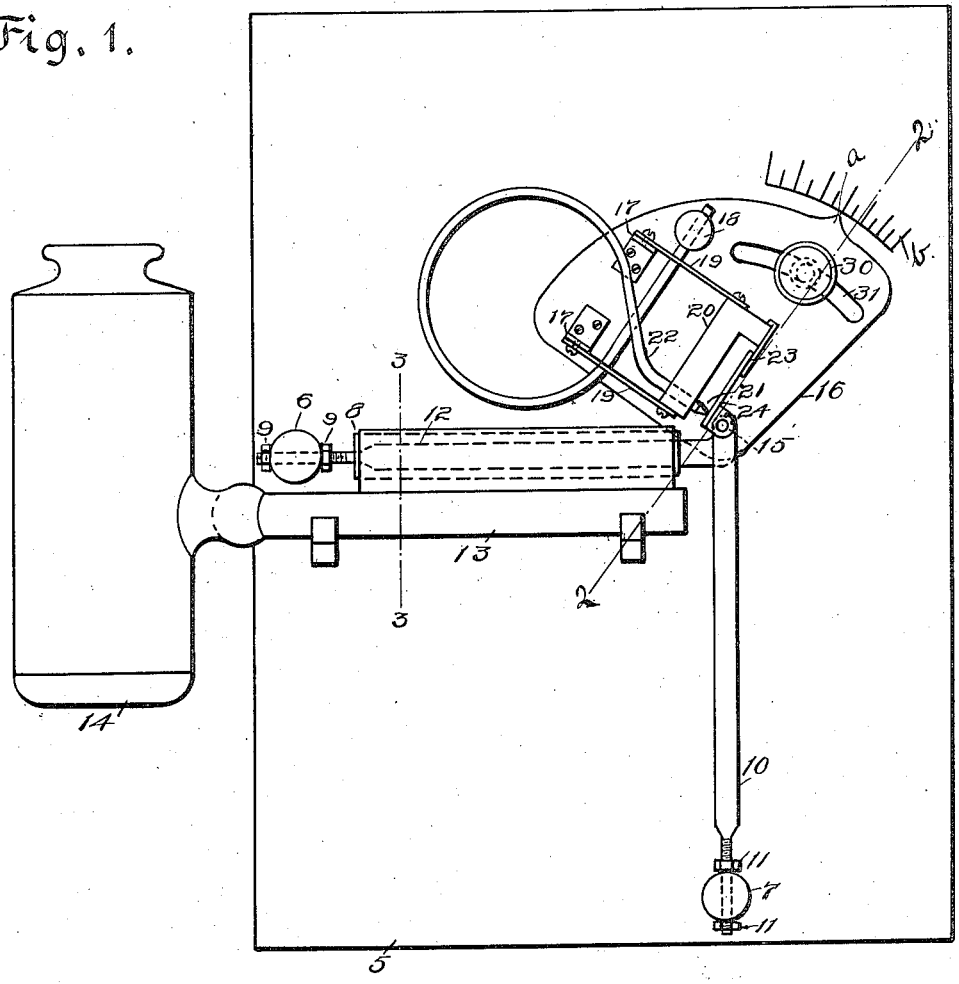
Figure 3:
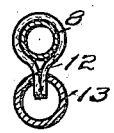
Figure 2:
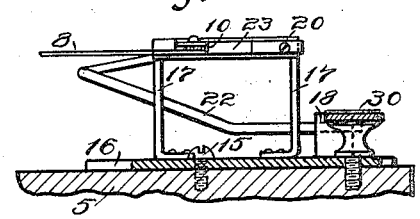

Figure 1, represents a front elevation of the improved thermostatic regulating device shown in relation to the outlet pipe of a pressure system by or through the control of the pressure of which moisture may be supplied through mechanism which is not shown as it does not necessarily form part of this invention. Fig. 2, represents a sectional view of parts of the same taken in line 2—2, Fig. 1, looking in the direction indicated by the arrows on said line. Fig. 3, represents a sectional view taken on line 3—3, Fig. 1.

Similar numbers of reference designate corresponding parts throughout.

As shown in the drawings, in its preferred form, 5 indicates a base having the posts 6 and 7 in which are respectively mounted the wet bulb thermostatic element 8. having the adjusting screws 9—9 and the dry bulb thermostatic element 10 having the adjusting screws 11—11. The thermostatic elements are disposed at substantially right angles to each other, as shown. The angular connections of these elements with the regulating device or valve are such that if one element tends to operate the device in one direction by expansion to produce an effect, expansion of the other element would tend to operate the device in an opposite direction and produce an opposite effect. These tendencies with reference to each other may be varied by mechanism hereinafter described. These elements 8 and 10 are made of any suitable material usually employed for such elements and are or may be of any suitable length, diameter and shape. Moisture is supplied to the element 8 by the wick 12 which extends over said element and into the moisture container 13 supported adjacent to element 8 and connected with the tank 14. The inner ends of the elements 8 and 10 are for convenience of construction, herein shown as pivotally connected to an extension of the valve 24, but I do not limit myself to this construction.

On the base 5 is pivotally mounted, by means of the pivot 15, the plate 16 having the studs or projections 17, 17 and 18. To the outer ends of the studs 17, 17 are secured the flexible arms 19, 19, which in the drawing are shown as flat springs, and to these flexible arms 19, 19. is secured the relatively rigid cross piece 20 carrying the outlet 21 of the flexible pressure pipe 22 one portion of which pipe is secured to the stud 18. Mounted on the cross piece 20 or to an extension thereof is the flexible valve arm 23 having the valve 24 which coöperates with the outlet 21 to control the flow of pressure medium from said outlet and to thus effect, through the flow of such pressure medium or the decrease of pressure in said pipe 22 the regulation of any pressure controlled mechanism connected with said pipe 22. By swinging the plate 16 on its pivot 15 to various positions indicated by the scale marks *a*, *b*, respectively on said plate 16 and on the base 5 the valve 24 may be adjusted with relation to the angle of extension of the elements 8 and 10 whereby adjustment of the device is effected to maintain the desired humidity. When the temperature rises unduly the element 10 will expand and cause the valve 22 to move toward the outlet 21 to reduce or shut off the pressure medium issuing from said outlet, or, if the temperature falls said element 10 will contract and open said valve 24. If, when the valve 24 is closed the humidity of the atmosphere rises above the normal or above the point at which the device is set, the evaporation of the moisture from the wick 12 of the wet bulb thermostatic element 8 is decreased causing a relative increase in the temperature of said element 8, and said element expands and acts on the valve 24; as the opening of the valve 24 is resisted by the element 10 such action of element 8 effects the lateral movement of the support 20 by the yielding of its arms 19, 19, in which lateral movement the support 20 with its mouth piece 21 diverges somewhat from the path in which the valve 24 and its arm 23 are forced by said element 8 whereby a separation is effected between the valve 24 and the outlet 21 and the pressure medium escapes from said outlet.

It is a fact that within the limits of temperature, both dry and wet bulb, in which this apparatus is designed to operate, the dry and wet bulb temperatures for any percentage of humidity bear always a constant ratio, the beginning or zero of said temperature being taken at a point about 4% above zero F. It is also true that under conditions of saturation of 100% humidity the dry and wet bulb temperatures are always the same. In the apparatus shown, if the dry and wet bulb elements are alike and placed at right angles to each other and the valve device is so placed as to operate in a direction perpendicular to a line bisecting the angle between the elements it is plain that the valve will remain stationary with reference to its seat under the limited action of the elements 8 and 10, if each is affected by the same temperature change. If the dry and wet bulb temperatures should differ, when the apparatus is adjusted for 100%, then an action on the valve with reference to its seat would take place by the expansion of either of the elements 8 or 10 which in turn would operate on the humidity supply to restore the balanced temperature. If a condition of humidity of less than 100% is desired a different ratio of action of the thermostatic elements on the valve device must be had and to obtain this ratio the plate 16 is swung on its pivot 15. By reason of the flexibility of the attachments of the elements to their supports and the exceedingly slight range of movements of their free ends (practically microscopic), the action of either element cannot be considered as affecting the other, resulting in an independent action.

While I have herein shown a simple form of support for the outlet and its valve whereby the outlet and valve may have relative movement or, by reason of which support and its flexible arms the outlet and valve may swing, I do not thereby intend to limit my invention to such construction or to any other specific construction.

The outlet 21 may represent one terminal of an electric circuit and the valve arm 23 the other terminal of said circuit the opening and closing of which terminals may through the operation of electrical regulating mechanism connected in said circuit operate humidity supplying devices.

Having thus described my invention, I claim as new and desire to secure by Letters Patent—

1. A thermostatic regulating apparatus comprising a device for controlling a source of energy, and a pair of thermostatic elements operating independently on said device, such elements having a different degree of action on said device caused by their different angular relations thereto.

2. A thermostatic regulating device comprising a pressure pipe having an outlet, a yielding support for said outlet, a valve having a connection with said support, and a pair of thermostatic elements operating independently of each other on said valve and adapted to be influenced respectively by the dry bulb and wet bulb temperatures of the air.

3. A thermostatic regulating device comprising a pressure pipe having an outlet, a yielding support for said outlet, a valve having a connection with said support, and a pair of thermostatic elements adapted to be influenced respectively by the dry bulb and wet bulb temperatures of the air, operating independently of each other on said valve, one of said elements acting in a direction to deflect said support.

4. A thermostatic regulating device comprising a pressure pipe having an outlet, a yielding support for said outlet, a valve connected with said support, and a thermostatic element connected with said valve and operating through said valve on the support to effect relative diverging and converging movement of said valve and its outlet.

5. A thermostatic regulating device comprising a pressure pipe having an outlet, a movable support for said outlet, a valve connected with said support and coöperating with said outlet, a thermostatic element acting on said valve to effect movements thereof, and a second thermostatic element acting on said valve and, through said valve, on said movable support to effect movements thereof independently of the action of the first-mentioned thermostatic element.

6. A thermostatic regulating device comprising a base, a member pivotally mounted on said base, a pressure pipe having an outlet mounted on said pivoted member, a valve for said outlet, and a pair of angularly disposed thermostatic elements, adapted to be influenced respectively by the dry and wet bulb temperatures of the air, supported on members mounted on said base and having their adjacent ends operatively connected with said valve.

7. A thermostatic regulating device comprising a base, a member pivotally mounted thereon for adjustment, a support yieldingly mounted on said member, a pressure pipe having an outlet mounted on said support, a valve having an arm attached to said support, and a pair of angularly disposed thermostatic elements, adapted to be influenced respectively by the dry bulb and wet bulb temperatures of the air, having their outer ends fixed and their inner ends operatively connected with said valve.

8. A thermostatic regulating device comprising a pair of independent angularly disposed thermostatic elements, and a controlling device having a movable member with which said elements are operatively connected.

9. A thermostatic regulating device comprising a support movably mounted and carrying one member of a regulating system, a second member of said system movable with respect to said support and connected thereto, and a pair of thermostatic elements angularly disposed and operatively connected with said second member.

EDWARD W. COMFORT.

Witnesses:
  HENRY J. MILLER,
  E. S. ROCHE.